United States Patent [19]
Hashimoto et al.

[11] Patent Number: 5,336,046
[45] Date of Patent: Aug. 9, 1994

[54] NOISE REDUCED CENTRIFUGAL BLOWER

[75] Inventors: Katsuhiko Hashimoto, Tsuchiura; Yoshinori Fukasaku; Shinichi Fujino, both of Hitachi; Mitsuaki Mirumachi, Mito, all of Japan

[73] Assignees: Hatachi, Ltd.; Hitachi Automotive Engineering Co., Ltd., Japan

[21] Appl. No.: 957,103

[22] Filed: Oct. 7, 1992

[30] Foreign Application Priority Data

Oct. 9, 1991 [JP] Japan ................. 3-261730

[51] Int. Cl.$^5$ ............................................. F04D 29/66
[52] U.S. Cl. ................... 415/119; 415/214.1; 417/312
[58] Field of Search ........... 415/119, 214.1, 215.1; 417/312

[56] References Cited

U.S. PATENT DOCUMENTS

| | | | |
|---|---|---|---|
| 3,312,389 | 4/1967 | Matsui | 415/119 |
| 3,360,193 | 12/1967 | Harris et al. | 415/119 |
| 3,485,443 | 12/1969 | Earhart | 415/119 |
| 3,938,905 | 2/1976 | Wadensten | 415/119 |
| 5,199,846 | 4/1993 | Fukasaku et al. | 415/119 X |

FOREIGN PATENT DOCUMENTS

| | | |
|---|---|---|
| 37853 | of 0000 | Australia . |
| 83704 | of 0000 | European Pat. Off. . |
| 412545 | 2/1991 | European Pat. Off. . |
| 48-63305 | 11/1973 | Japan . |
| 57-24566 | 5/1982 | Japan . |
| 63-90415 | 4/1988 | Japan . |
| 121298 | 5/1991 | Japan ............... 415/119 |
| 156199 | 7/1991 | Japan ............... 415/119 |

*Primary Examiner*—Edward K. Look
*Assistant Examiner*—Michael S. Lee
*Attorney, Agent, or Firm*—Evenson, McKeown, Edwards & Lenahan

[57] ABSTRACT

A blower of an automotive air conditioner has a lower casing a part of which is formed is a plastic housing for a motor and a porous member in the form of a flat plate disposed at a position where the plastic housing and an upper casing of the blower abut against each other. An air layer is defined between the flat-plate porous member and the lower casing to add a muffling function.

9 Claims, 7 Drawing Sheets

NOISE REDUCED CENTRIFUGAL BLOWER

BACKGROUND AND SUMMARY OF THE INVENTION

The present invention relates to a blower structure for an automotive air conditioner or the like and, more particularly, to a scroll casing structure effective to reduce noise from this type of blower.

This invention can widely be applied to blowers for home use, for use in office machines, for cooling electronic computers and for other purposes, requiring low noise performance, as well as to blowers for automotive air conditioners.

A conventional blower, such as that disclosed in Japanese Unexamined Utility Model Publication No. 48-63305, is formed of a fan, a scroll casing in which the fan is housed, and a motor for driving and rotating the fan. This blower structure is such that air is drawn from one side of the fan and blown in the radial direction of the fan. The scroll casing has a function of gradually restoring a dynamic pressure generated by the rotation of the fan to a static pressure in the scroll casing. In an automotive air conditioner, such as that disclosed in Japanese Unexamined Utility Model Publication No. 57-24566, an inside/outside air changing box has been divided for indirectly reducing various kinds of radiated noise. An, an example of means for reducing noise comprises a sound absorbing member formed of a combination of a porous elastic member and a non-porous elastic member and secured to a surface of the porous elastic member to a surface of the porous elastic member to a scroll casing, as disclosed in Japanese Unexamined Patent Publication No. 63-90415.

The prior art disclosed in the above mentioned Japanese Unexamined Utility Model Publication 48-63305 has a considerably high level of noises from the entire blower, such as air pulsation noise generated from the fan, noise of generation of vortices by separation, generation of a turbulent flow in the scroll casing, and the like. In the automotive air conditioner such as that disclosed in above mentioned Japanese Unexamined Utility Model Publication No. 57-24566, since the inside/outside air changing box is deviced for improvements with respect to these problems, with a result that restrictions are added in respect of vehicle mount conditions and the structure of the inside/outside air changing box is complicated, so that the provision of a low-priced automotive air conditioner improved performance over a wide variety of uses has not been achieved.

With respect to noise reduction based on the sound absorbing member attached to the scroll casing as described in the above mentioned Japanese Unexamined Patent Publication No. 63-90415, a soft polyurethane foam ordinarily used as a sound absorbing material has a high sound absorbing effect with respect to high frequencies above 1000 Hz but has a low effect with respect to frequencies below 1000 Hz. The example disclosed in Japanese Unexamined Patent Publication No. 63-90415 employs a sound absorbing member consisting of two kinds of sound absorbing members attached to each other to absorb vibrational energy of sound waves of a wide range of frequencies to solve the above-described problem, but other problems described below are encountered. If such a sound absorbing member is used, for example vibrational energy of sound waves of low frequencies can be absorbed because a porous material is used as a surface layer, but sound waves cannot reach an inner layer and are, adversely, reflected, so that the effect of a porous elastic material provided on the inner layer is not sufficiently exhibited. In this case, eyed an effect equal to that of a porous elastic material alone cannot be achieved and high-frequency sound is not reduced. Further, if the operation of attaching the sound absorbing member to the scroll casing is performed over the entire inner wall surfaces of the scroll casing in an attempt to optimize the utilization of the effect, an operation to attach the sound absorbing member to a curved surface is included but the attachment process cannot be completed easily, resulting an increase in the cost. Also, there is a need for preventing separation of the sound absorbing member because it is in contact with an air passage surface.

An object of the present invention is to solve these problems and to provide a blower of this kind having a muffling effect over a wide range from low frequencies to high frequencies and thus capable of reducing noise.

The above object is achieved by forming a part of a scroll casing for holding a motor body, constructing the scroll casing by this motor-side scroll casing part and a bell-mouth-side scroll casing part in which a bell mouth is formed, providing a porous member in the form of a flat plate at a position where these two casing parts abut against each other, and constructing a muffling mechanism by the flat-plate porous member and an air layer defined between the flat-plate porous member and the bell-mouthside casing part.

With the above-described structure in accordance with the present invention, sound waves of mixed noises, such as air pulsation noise generated in the upper scroll casing having the flat-plate porous member as a blower bottom wall, vortex noise caused by separation from the blades with the rotation of the fan, and turbulent flow noise in the casing and the like pass through the porous member, so that the sound waves are reduced in medium and high-frequency ranges. Further, the sound waves reach a lower scroll casing inner wall formed of an air layer defined by the flat-plate porous member and the housing and are reflected to interfere with each other in the air layer, so that low frequency range sound is also reduced.

The above and other objects, features and advantages of the present invention will be made more apparent by the following description with reference to the accompanying drawings.

DESCRIPTION OF PREFERRED EMBODIMENTS

Figure 1:
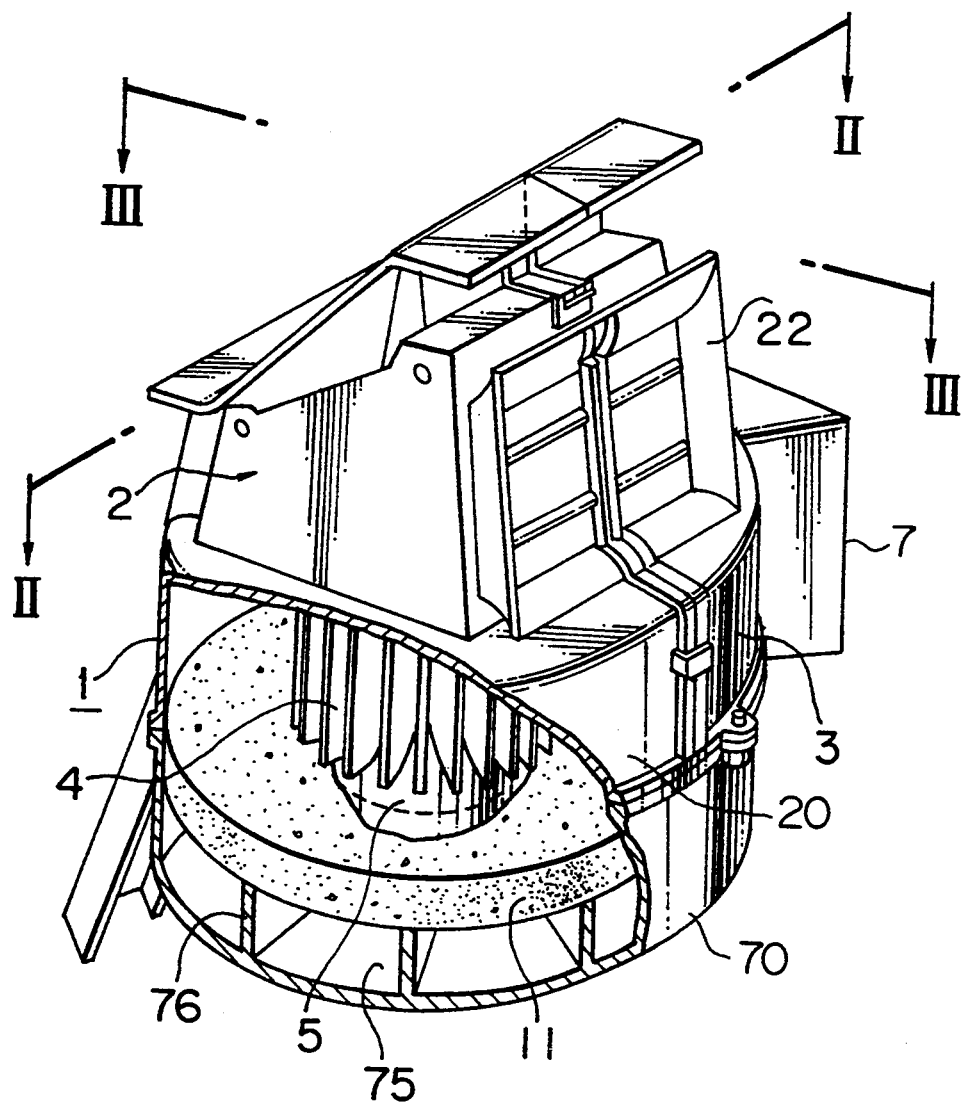
FIG. 1 is a perspective view of the automotive centrifugal blower in accordance with the present invention.

An embodiment of the present invention will be described below with reference to FIGS. 1 to 3. A motor vehicle centrifugal blower 1 ordinarily has, in its upper portion, an inside/outside air induction changing box 2 which selectively introduces air on the outside or inside of the vehicle compartment and comprises a scroll casing 3, a fan 4 housed in the scroll casing and a motor 5 for rotating the fan. Air on the inside or outside of the vehicle compartment is drawn through the air induction changing box 2 selectively opened/closed and is introduced into the scroll casing 3 through an air inlet (bell mouth portion) 6. Air is then blown in a radial direction of the fan 4 to an outlet 7 of the scroll casing 3. This scroll casing 3 serves to convert a dynamic pressure generated by the rotation of the fan into a static pressure. In accordance with the present invention, this centrifugal blower is arranged in such a manner that a muffling function is added by a combination of a porous member and an air layer formed by a plastic housing holding the body of the motor. The porous member is fixed between the scroll casing and the plastic housing to achieve simplification of the structure and to improve assembly facility. Also, the porous member is formed as an elastic member containing activated carbon therein or honeycomb structure containing a deodorant therein so that a structure having both deodorizing and muffling functions can be achieved.

Figure 2:
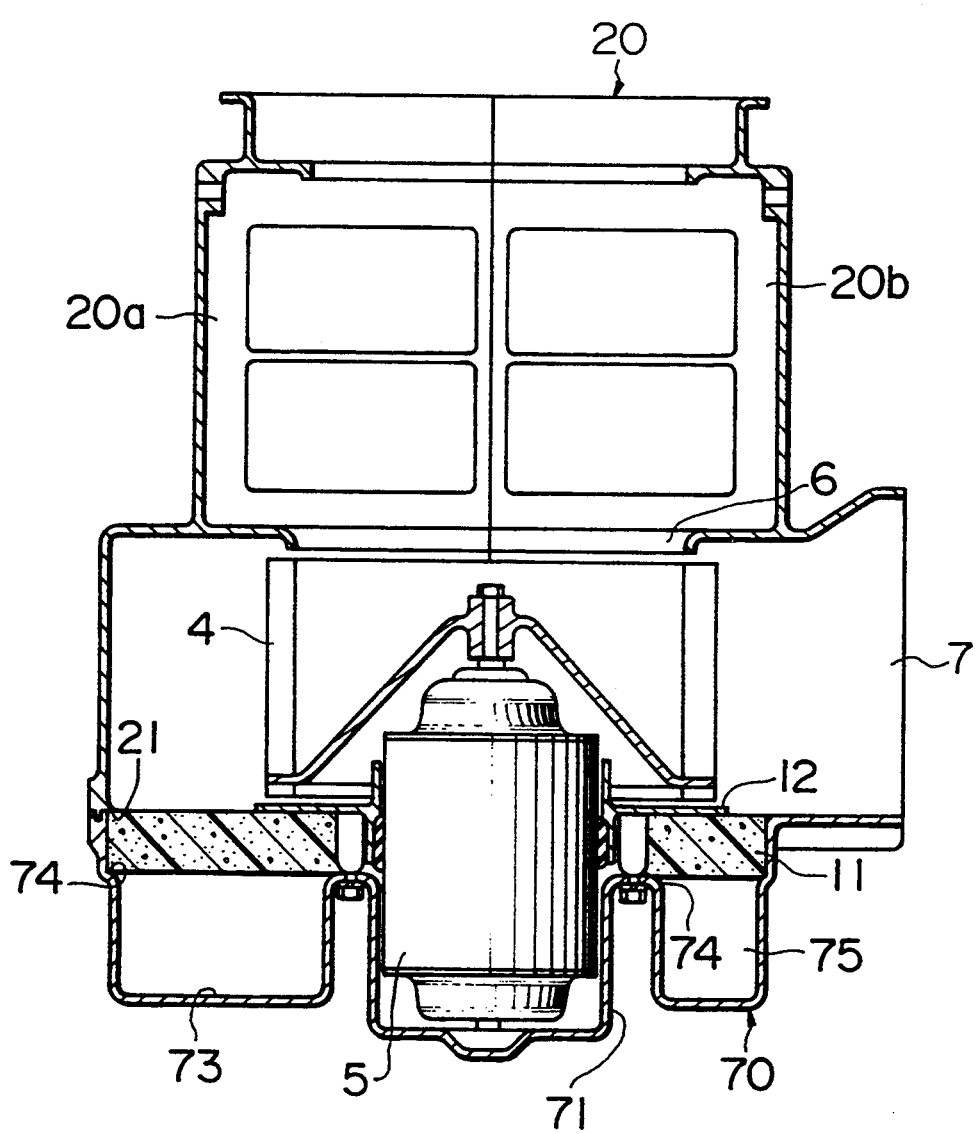
FIG. 2 is a cross-sectional view taken along line II—II in FIG. 1.
Figure 3:
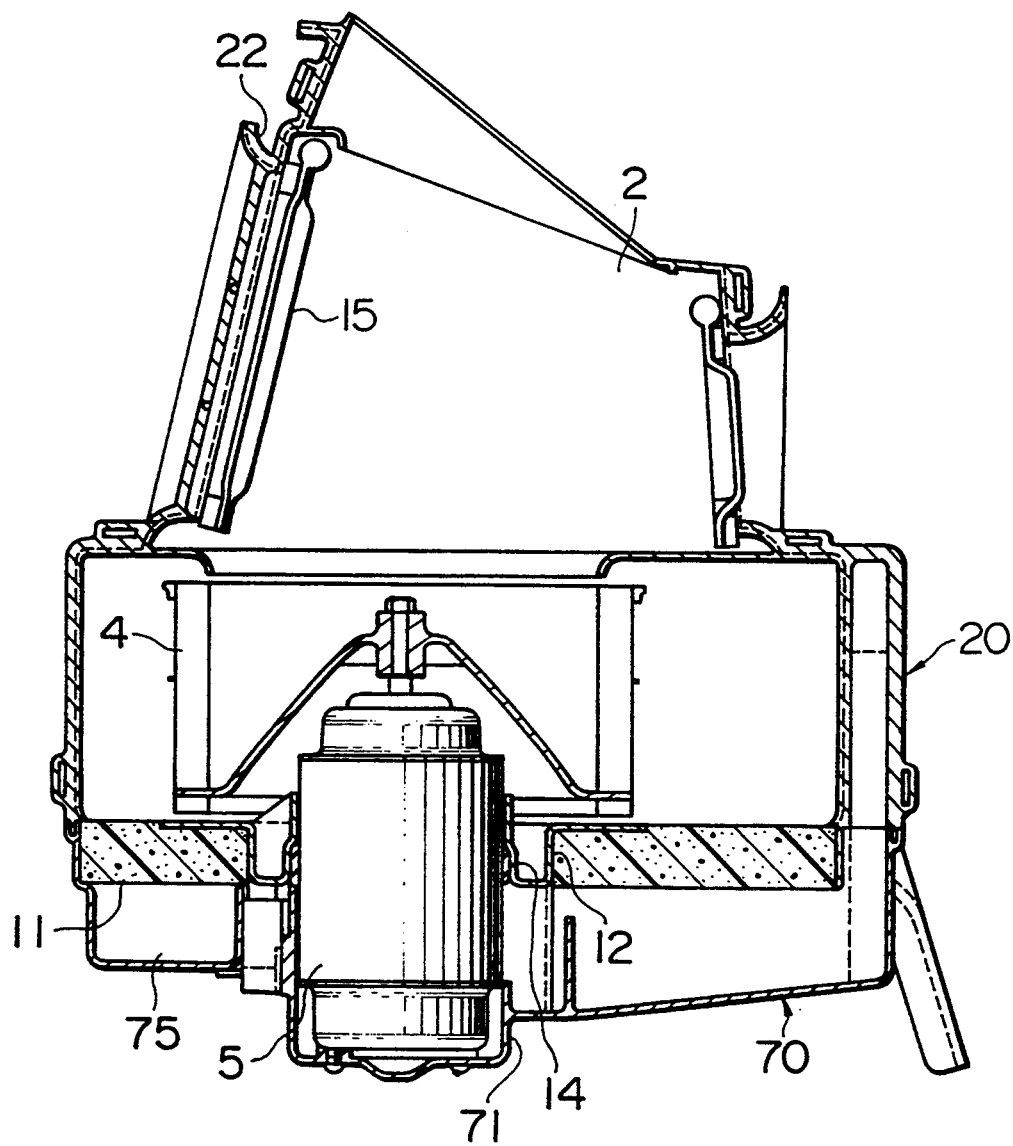
FIG. 3 is a cross-sectional view taken along line III—III in FIG. 1.
Figure 4:
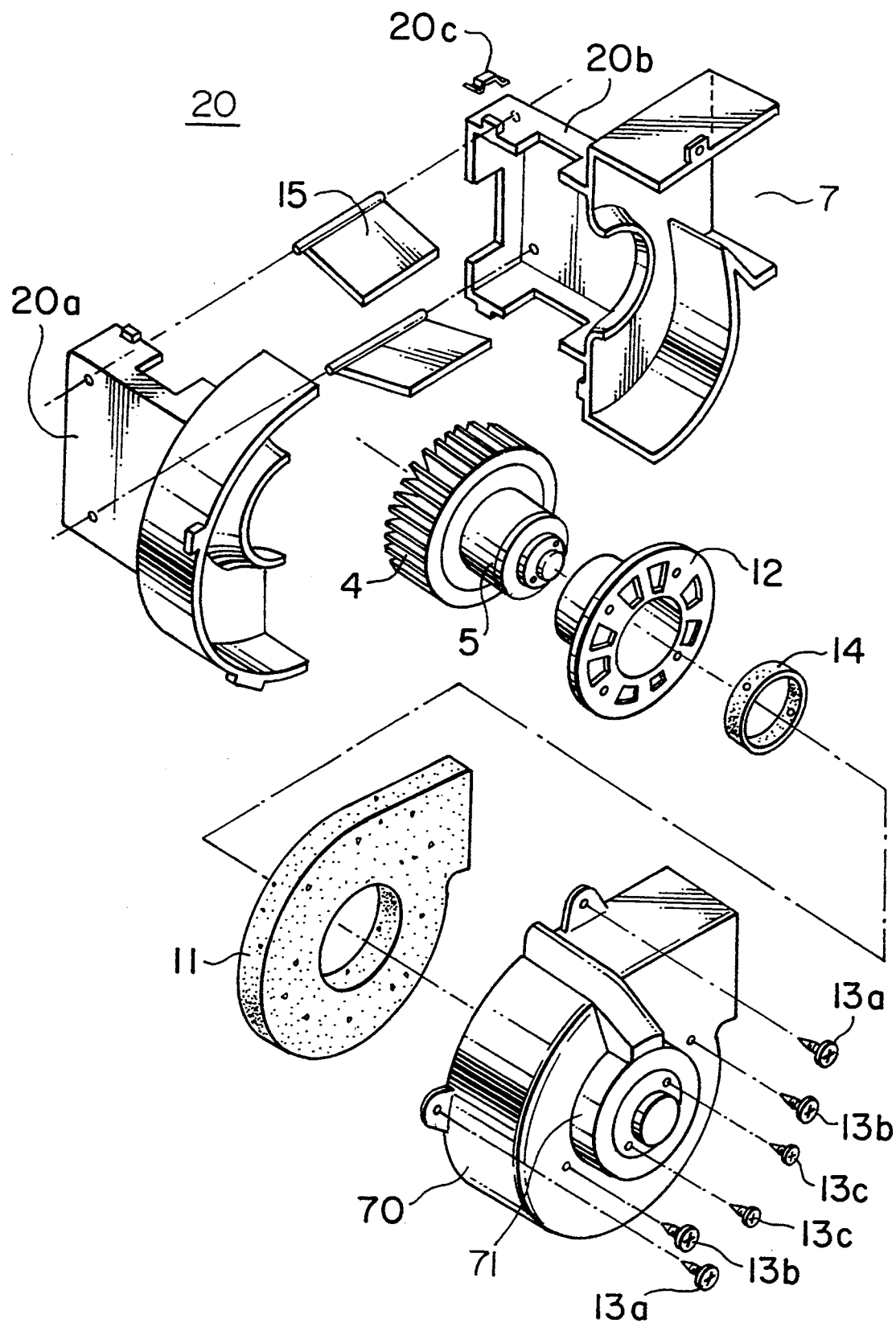
FIG. 4 is an exploded view of the centrifugal blower in accordance with the present invention.

More specifically referring to FIGS. 1 and 2, an upper casing 20 is formed by a first case 20a and a second case 20b divided into left and right members. A lower casing 70 for covering a lower part of the upper casing 20 is formed by a plastic housing 71 which holds the motor 5. An air layer 75 is provided between the upper casing 20 and the lower casing 70, thus forming a double structure. A flat plate like frame member 12 for retaining a porous member 11 is provided between the upper casing 20 and the lower casing 70 and is fixed together with the upper casing 20 and the lower casing 70 by screws 13a (FIG. 4).

An intake bell mouth 22 for rectifying air flow is formed in an outer peripheral surface of an inside air inlet of the inside/outside air changing box 2 formed on the upper casing 20 (FIG. 1). The lower casing 70 can be changed in shape as desired according to low-range frequencies described later while avoiding interference with vehicle component parts when mounted on a vehicle, and it is not always necessary to adapt the shape of the lower casing 70 to the upper casing 20.

The porous member 11 retained by the frame member 12 is a material such as a mass of fibers or fine particles defining continuous gaps or a foamed material having continuous cells, or the same kind of elastic member containing activated carbon or honeycomb-like porous member containing a deodorant. Sound waves incident upon surfaces of these materials enter the interior thereof by propagating through air in the gaps and lose their energy mainly due to viscosity and thermal conduction. This is the principle of the sound absorption by porous member. In general, if the thickness of the porous member 11 is increased, the sound absorbing effect is improved, but the cost is increased and the manufacture thereof becomes difficult. Further, a main sound absorbing range of this porous member 11 is a high and intermediate frequency range, and the sound absorbing effect of the porous member with respect to a low-frequency range is considerably lower.

In accordance with the present invention, the air layer 75 is provided on the back side of the porous member 11, so that noise can be reduced through the overall frequency range. The noise reduction rate can be freely changed by selecting the volume of the air layer 75, the thickness of the porous member 11 and the material of the porous member 11. The principle of this effect will be described below. With the rotation of the fan 4, various kinds of noises, such as air pulsation noise, vortex noise caused by separation from blades, and noise caused by turbulence of air, are mixed and sound waves thereof pass through the porous member 11 provided between the upper casing 20 and the lower casing 70. At this time, noise in a high-frequency range is reduced by the above-described effect. Thereafter, the sound waves enter the space section of the air layer 75. The sound waves which have entered, particularly those in a low-frequency range not previously attenuated by the porous member 11 are attenuated in accordance with the principle of a muffler by being reflected by an inner wall surface 73 of the lower casing 70 formed by the plastic housing 71 and by interfering with sound waves which have passed through the porous member 11.

As described above, a casing having a combination of the porous member 11 and the air layer 75 is provided to enable the noise in the overall frequency range to be reduced and make it possible to freely change the reduction rate. In the case in which only the porous member 11 is provided, i.e., without providing air layer 75, in the casing, noise can also be reduced more than in the conventional centrifugal blower.

Also, it is possible to achieve a structure having both deodorizing and muffling functions by using, as the porous member 11, an elastic member containing activated carbon or a honeycomb-like porous member containing a deodorant. The assembly structure of the upper casing 20 and the lower casing 70 will next be described below in detail.

FIG. 4 shows in an exploded view parts of the motor vehicle blower in accordance with the present invention. Left and right divided cases 20a and 20b are fastened together by a spring 20c or screws (not shown) to form the upper casing 20. In the upper casing 20, the inside/outside air changing box 2 for changing vehicle inside/outside air and a changeover damper 15 are provided and, further, the scroll casing 3 is formed to be opened at its bottom with, and the bell mouth portion 6 for introducing air in the periphery of the scroll casing 3. The upper casing 20 and the lower casing 70 for holding and housing the motor 5 are secured together by the screws 13a. Next, the assembly structure of the porous member 11 and the lower casing 70 will be described below in detail with reference to FIGS. 4 and 5.

Figure 5:
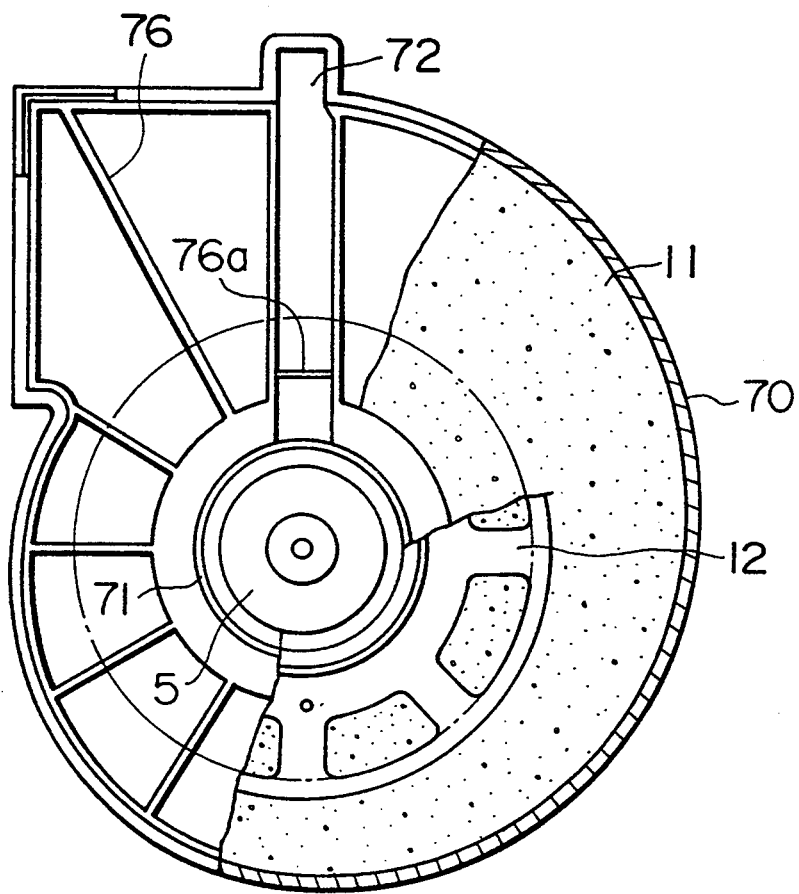
FIG. 5 is a top view of the lower casing of the centrifugal blower in accordance with the present invention.

FIG. 5 is a top view of an assembly in which the plastic housing 71 for holding the body of the motor 5, the motor 5 and the porous member 11 are assembled on the lower casing 70.

A tubular retainer plate 12 having a flange for pressing the porous member 11 is press fitted to the outer periphery of an iron yoke of the motor 5 with a rubber ring 14 interposed therebetween. The motor 5 with this retention plate 12 is inserted into the plastic housing 71 and is fixed to the lower casing 70 by screws 13b and 13c. The plastic housing 71 is formed integrally with the lower casing 70, and a portion 74 for receiving porous member 11 is provided on the lower casing 70. A pouch-like bottom wall of the lower casing 70 is positioned so as to be at the same level as an axial end of the motor 5 or slightly project outwardly relative to this end. The motor 5 is surrounded by an air layer 75 and the lower casing 70. Consequently, the structure is such that noise radiated from the motor 5 is absorbed and reflected by these muffler members, and at least reverberation sound is scattered in the axial direction of the motor, so that noise cannot easily be radiated directly to the outside. The porous member 11 is fixed by being sandwiched between a retention portion 21 provided at a lower edge portion of the upper casing 20 (FIG. 2), the retention plate 12 and the receiving portion 74 of the lower casing 70.

Figure 6:
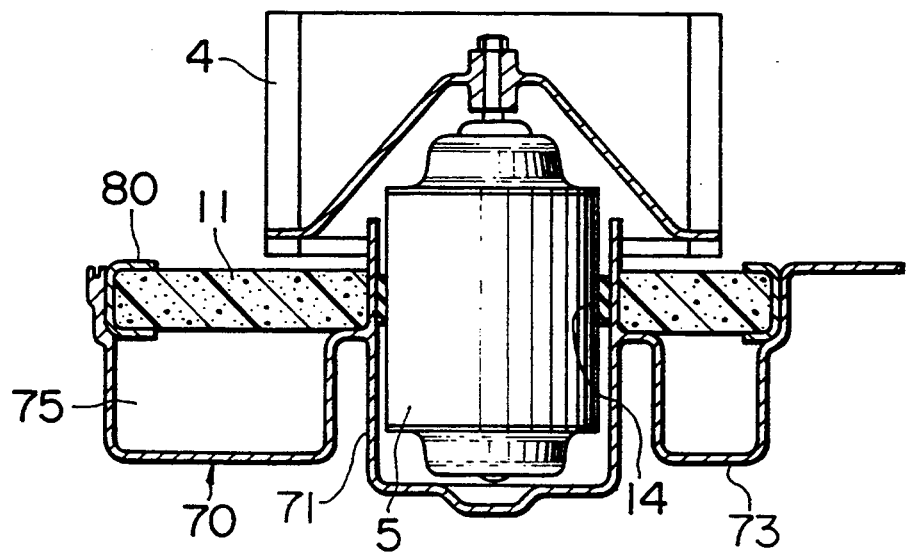
FIG. 6 is a diagrammatic illustration of a modified assembly of a plastic housing for holding a motor, the motor, and a porous member.

If the porous member 11 is an elastic member such as an urethane foam, the porous member 11 may be held by a frame member 80 having the necessary smallest grid portion at an outer portion as shown in FIG. 6, and the frame member 80 may be supported by a plurality of ribs 76 extending upright from an inner bottom wall surface of the lower casing 70, as needed rather than by the receiving portion 74 shown in FIG. 1. If the structure shown in FIG. 6 is adopted, employed the frame 80 holding the porous member 11 therein can be fixed easily and securely between the upper casing 20 and the lower casing 70. Since, in this construction, the frame 80 can be separated from and independent of the upper casing 20 and the lower casing 70, any one of various kinds of porous members, such as foams of synthetic resins (e.g., polyurethane, vinylchloride, polyethylene, polypropylene, polyamide and polystyrene resins, rubber foams of NBR, SBR and natural rubber, and glass wool) can be easily mounted.

Also, in the lower casing 70, an air layer 75 is formed by the porous member 11. The housing 71 forming a motor housing, and the bottom wall 73 of the lower casing 70, which form a casing unit, and the plurality of ribs 76 extending upright from the bottom wall 73 are brought into abutment against a bottom surface of the porous member 11 opposite to the air blow path of the centrifugal blower, thereby forming a motor cooling air passage 72. An air passage for introducing cooling air from the cooling air passage 72 into the motor is formed.

The height of a part of the plurality of ribs 76 is changed to form a water stop wall 76b by avoiding contact with the bottom surface of the porous member 11 opposite to the air blow path of the centrifugal blower.

Further, mount legs are provided on the upper casing 20, and the motor 5 and the fan 4 are mounted on the lower casing 70. Therefore, when the motor 5 is changed, only the lower casing 70 has to be removed and there is no need to dismount the entire blower from the vehicle. Easier maintenance of the motor is thereby facilitated.

Figure 7:
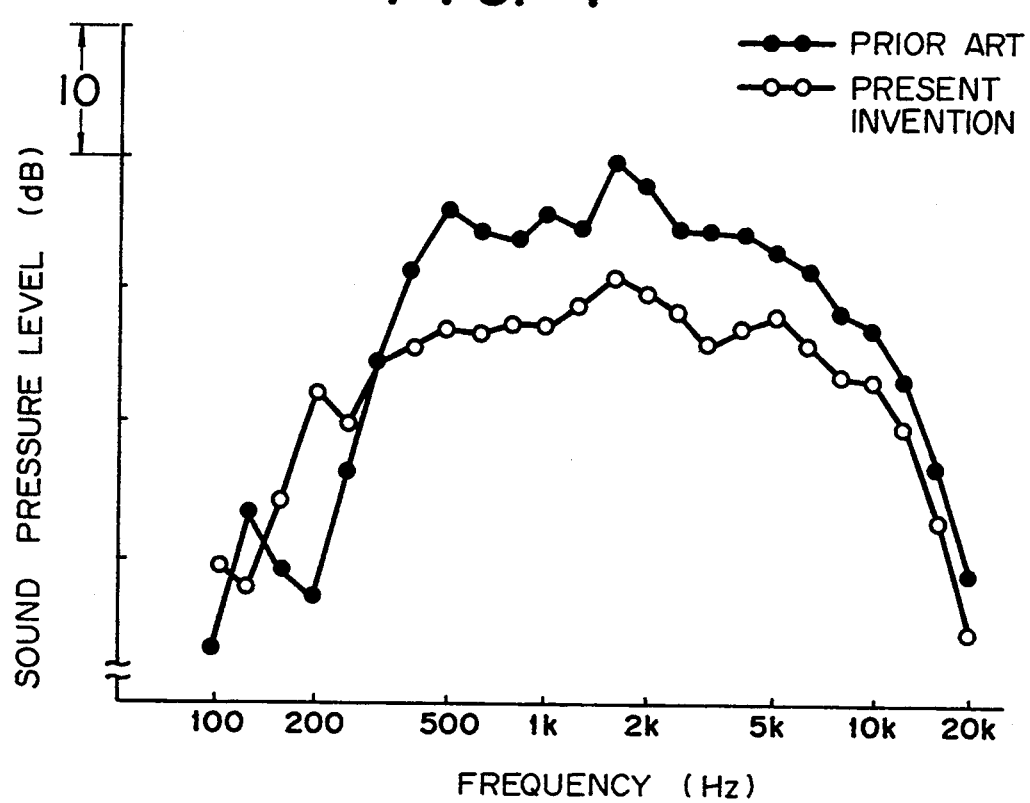
FIG. 7 shows the result of measurement of noise from the centrifugal blower to which a muffling function is added.

FIG. 7 shows the result of a measurement of noise from a centrifugal blower to which the above-described muffling function is added.

Figure 8:
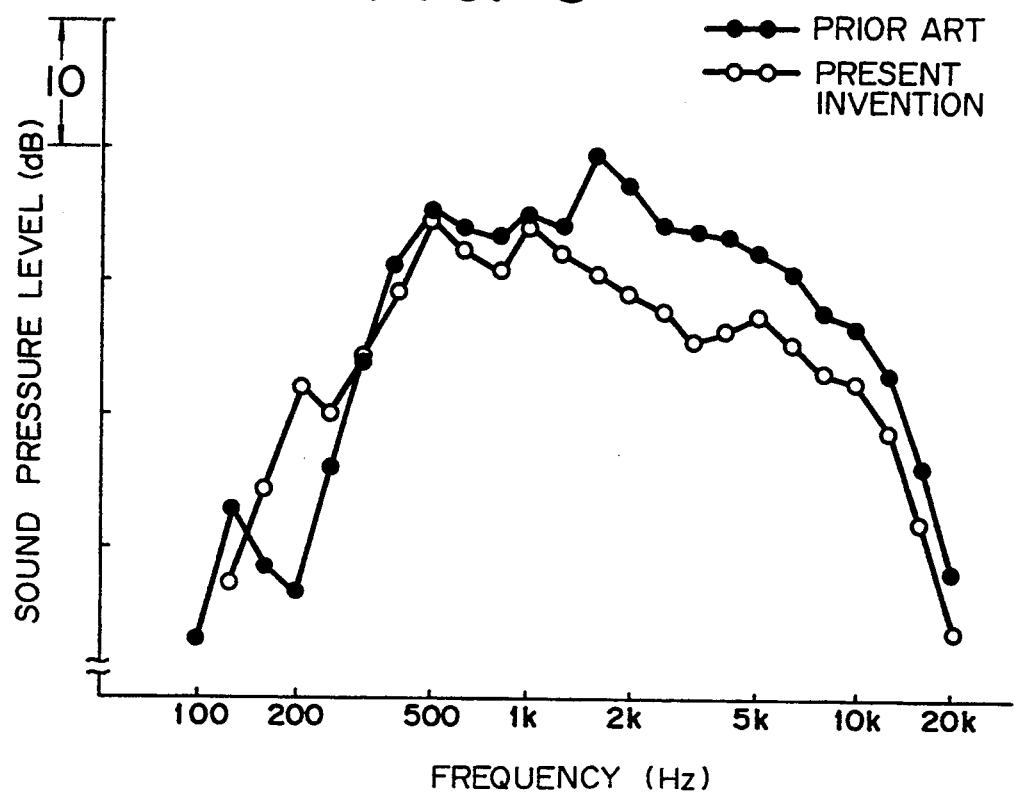
FIG. 8 shows the result of measurement in the case of using only the porous member.

The noise measurement is performed at a point at a distance of 1 m from the air inlet 6. In FIG. 7, said black circular marks represent the noise frequency analysis results from the conventional scroll casing, while white circular marks represent the corresponding results from the scroll casing structure of the present invention. It can be understood from FIG. 7 that noise was reduced through a wide range of 200 Hz to 10 kHz. FIG. 8 shows the result of a noise measurement in the case in which only a porous elastic member was used. In FIG. 8, said black circular marks represent the noise frequency analysis results from the conventional scroll casing, while white circular marks represent the corresponding results from the structure having the combination of the porous elastic member and the scroll casing. A difference from the results of the former case resides in that noise in the frequency range below 1 kHz was not substantially reduced, while noise in the frequency range above 1 kHz was reduced. As can be understood from these two experiments, a noise in the medium and high-frequency ranges can be reduced where a combination of the porous member and the scroll casing was used, and noise in a low-frequency range can also be reduced by further combining the air layer.

Figure 9:
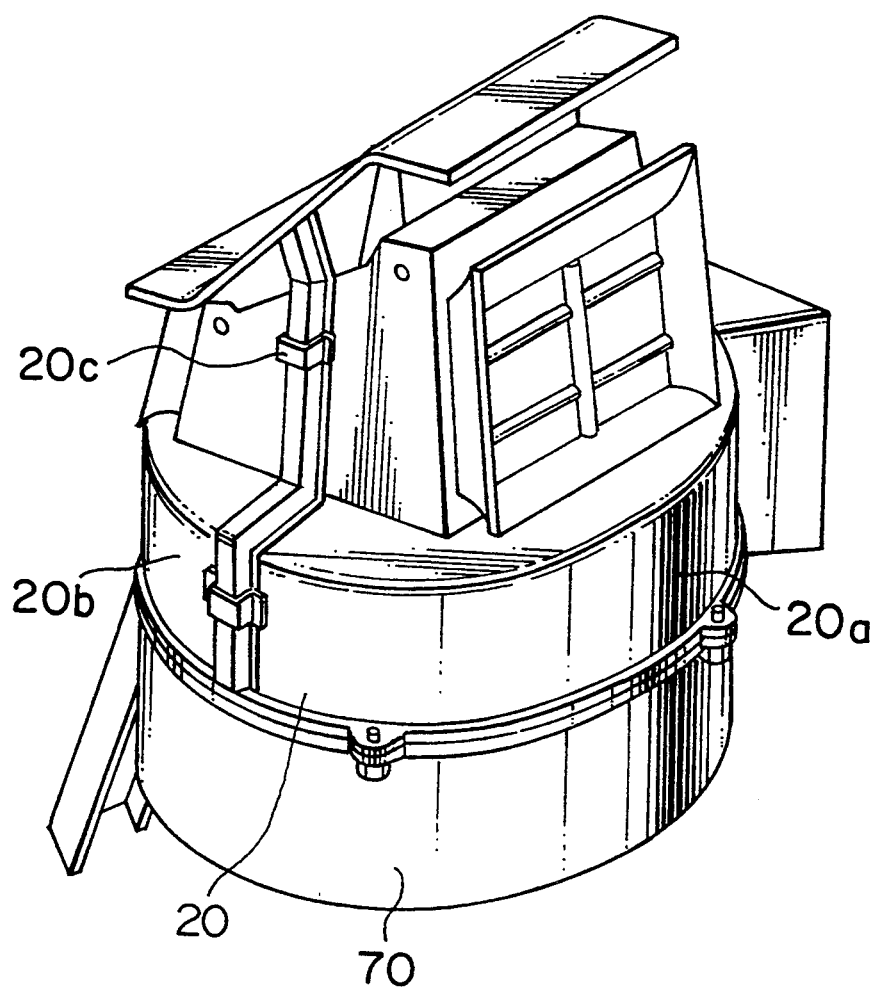
FIG. 9 is a perspective view of another embodiment of the centrifugal blower in accordance with the present invention.

FIG. 9 is a perspective view of another embodiment of the present invention. In this embodiment, the upper casing 20 is divided into left and right parts (which are connected together by a fastening spring) and is further fixed to the lower casing 70 by screws.

In this embodiment, an air layer is formed in the lower casing in such a manner that a part of the housing for holding the motor is extended so as to cover the motor body, so that noise from the motor can also be muffled and reflected in the lower casing to reduce sound radiated to the outside. Further, a structure is provided which enables the porous member to be manufactured and assembled separately and independently and to be fixed by being sandwiched between the upper and lower casings, so that various kinds of porous members can be selected and can be fixed easily and securely while the noise reduction rate and the reduction frequencies can be changed as desired.

As described above, in accordance with the present invention, a porous member is provided between the upper and lower casings and an air layer is defined by the porous member and the lower casing. Sound waves in which various kinds of noises, such as air pulsation noise generated in the upper casing, vortex noise caused by separation from the blades with the rotation of the fan, and turbulent flow noise in the casing, are mixed pass through the porous member, so that the sound waves are reduced in medium and high-frequency ranges. Further, the sound waves pass through the air layer, reach the lower casing inner wall and are reflected by this wall to interfere with each other in the air layer, thereby reducing sound in a low frequency range which has not been reduced. It is thus possible to reduce noise through the overall frequency ranges.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A blower, comprising a motor surrounded by an outer peripheral wall, a fan operatively arranged to be rotatably driven by the motor, and a scroll casing in which said fan is disposed, wherein said scroll casing has a first side wall having an air intake opening and a second side wall attached to said outer peripheral wall facing said first side wall and having an opening for a shaft of said motor, and a layer of a porous member is formed on and held by an internal surface of said second side wall wherein a space is provided between said porous member and said second side wall of said scroll housing said space surrounding an outer periphery of said motor, and said second side wall is so configured to at least partially constitute an air passage for guiding cooling air to said motor.

2. The blower according to claim 1, wherein the motor, the fan, the second side wall and the layer of a porous member are arranged to form an assembly that is attached to the first side wall.

3. The blower according to claim 1, wherein said internal surface includes a retainer plate mounted at the outer periphery of said motor so as to both hold said porous member and retain said motor in a lower portion of said scroll casing.

4. The blower according to claim 1, wherein said scroll casing comprises three casing parts with said porous member sandwiched between connected portions of the casing parts.

5. A blower unit for an automotive air conditioner, comprising a blower having a fan, a motor operatively associated with said fan for rotating said fan, a scroll casing in which said fan is accommodated, and an inside/outside air changer provided at an air-intake bell mouth portion of said scroll casing, wherein said scroll casing is divided into two independent parts, one adjacent the bell mouth and the other remote from the bell mouth, said one scroll casing part is further divided into two side parts together with said inside/outside air changer, said motor for rotating said fan is held on said other scroll casing part, said three casing parts are combined to form the scroll casing, a porous member is sandwiched between connected portions of said one and the other casing parts and partitions the interior of said scroll casing into a flow passage section in which said fan is accommodated and a muffling chamber section.

6. A blower for an automotive air conditioner wherein a blowing passage of the blower is defined by the operation of a scroll casing unit having an inside/outside air changer provided around an inlet portion of a bell mouth and of a porous member operatively associated with said second casing part, wherein said second casing unit includes flange portions separated generally at a central portion of a motor, one of said flange portions is positioned below a lower surface of a fan operatively associated with said motor and the other of said flange portions serves as a motor accommodation case covering a rear end portion of the motor, and said porous member is disposed between said split flange portions and is fixed by being sandwiched in the axial direction of a shaft of said motor, wherein a motor cooling air passage is formed in the motor accommodated case, an air layer is formed by said porous member and said motor accommodated case, and a plurality of ribs extending upright from a bottom wall of the second casing unit are brought into abutment against an adjacent wall surface of said porous member to define an air passage for introducing cooling air from said motor cooling air passage into the motor.

7. The blower for an automotive air conditioner according to claim 6, wherein a portion of said ribs has a difference in height from the remainder of the ribs so as to be located at a distance from a wall surface of the porous member opposite to the blowing passage to form a water spot wall.

8. A blower for an automotive air conditioner according to claim 6, wherein said porous member is mounted on a second casing unit for holding and accommodating a motor.

9. The blower for an automotive air conditioner according to claim 6, wherein said one flange portion comprises a flanged retainer plate mounted on an outer periphery of a yoke of said motor, said other flange portion includes a receiving portion for receiving said porous member, and said receiving portion is integral with said motor accommodation case and is fixed to said retainer plate by screws.

* * * * *